(12) United States Patent
Haidl et al.

(10) Patent No.: US 6,994,538 B2
(45) Date of Patent: Feb. 7, 2006

(54) APPARATUS AND METHOD FOR MOLDING OPTICAL LENSES

(75) Inventors: Markus Haidl, Aalen (DE); Norbert Hugenberg, Aalen (DE); Alexander Witte, Gerlingen (DE)

(73) Assignee: Carl Zeiss Vision GmbH, Aalen (DE)

( * ) Notice: Subject to any disclaimer, the term of this patent is extended or adjusted under 35 U.S.C. 154(b) by 198 days.

(21) Appl. No.: 10/222,587

(22) Filed: Aug. 16, 2002

(65) Prior Publication Data

US 2003/0057578 A1    Mar. 27, 2003

(30) Foreign Application Priority Data

Aug. 16, 2001  (DE) ................................ 101 41 159

(51) Int. Cl.
  *B29D 11/00* (2006.01)
(52) U.S. Cl. ...................... 425/180; 249/117; 249/161; 425/808; 264/205
(58) Field of Classification Search ................. 264/1.1, 264/2.2, 1.36, 1.38, 2.5; 425/808, 150, 175, 425/180; 249/117, 161
See application file for complete search history.

(56) References Cited

U.S. PATENT DOCUMENTS

| 5,547,618 A | 8/1996 | Magne |
| 6,015,512 A * | 1/2000 | Yang et al. ................... 264/2.2 |
| 6,419,860 B1 * | 7/2002 | Magne ....................... 264/1.38 |

FOREIGN PATENT DOCUMENTS

| EP | 0 318 164 | 5/1989 |
| JP | 11-170275 | 6/1999 |
| WO | WO 01/32407 A1 | 5/2001 |

* cited by examiner

*Primary Examiner*—Mathieu D. Vargot
(74) *Attorney, Agent, or Firm*—Harness, Dickey & Pierce, P.L.C.

(57) ABSTRACT

An apparatus and a method for molding optical lenses are disclosed. The apparatus comprises a first molding shell with a first diameter, a sealing element surrounding the first molding shell, and means for radially clamping the sealing element against the first molding shell, a second molding shell having a second diameter greater than the first diameter, and means for axially clamping the second molding shell with its inner shell surface against a radial front surface of the sealing element. This is done such a hollow cavity is enclosed between the molding shells and the sealing element. The radially clamping means and the axial clamping means are structurally distinct and independent one from the other. The axially clamping means are arranged on an outer shell surface of the second molding shell, opposite to the inner shell surface.

9 Claims, 6 Drawing Sheets

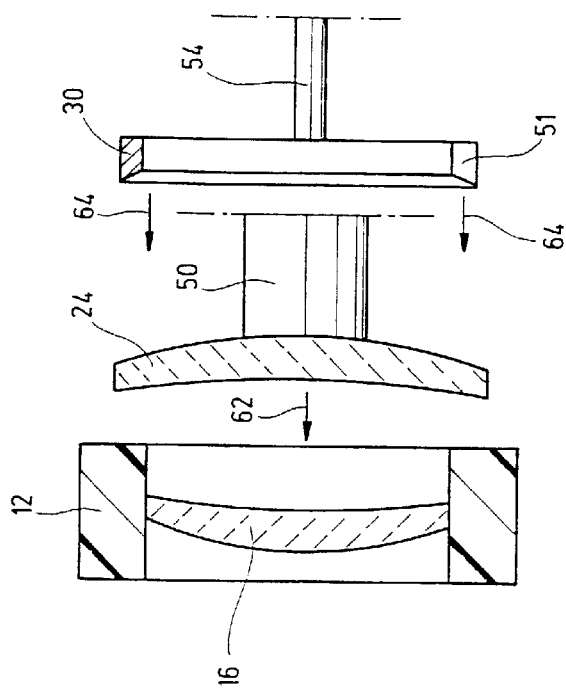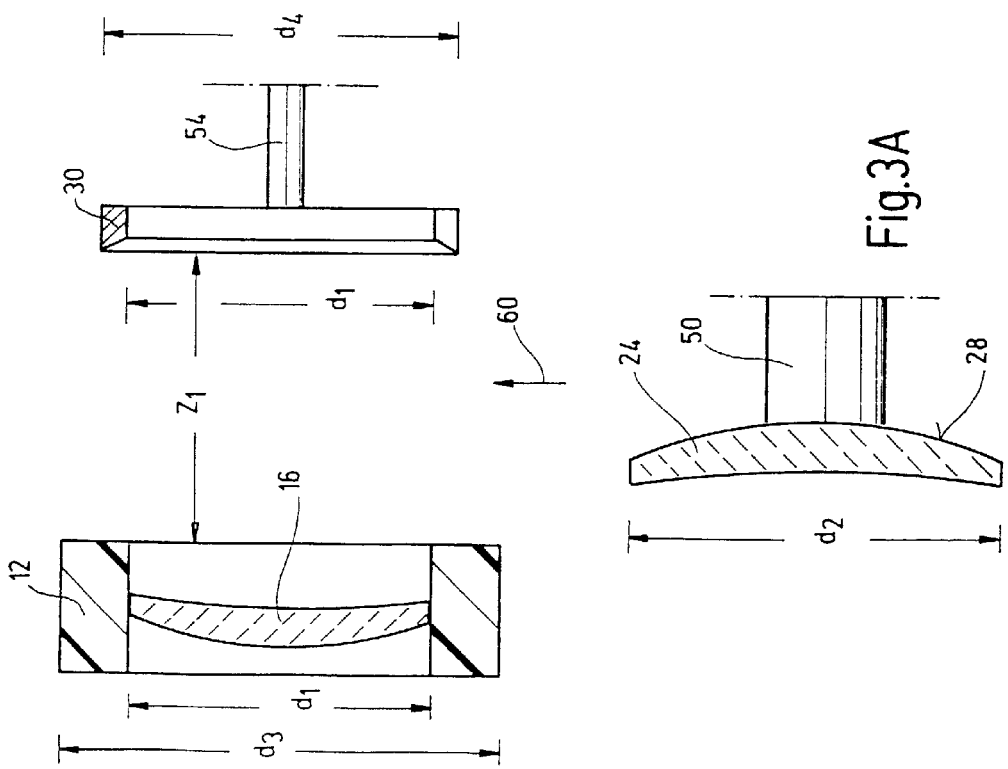

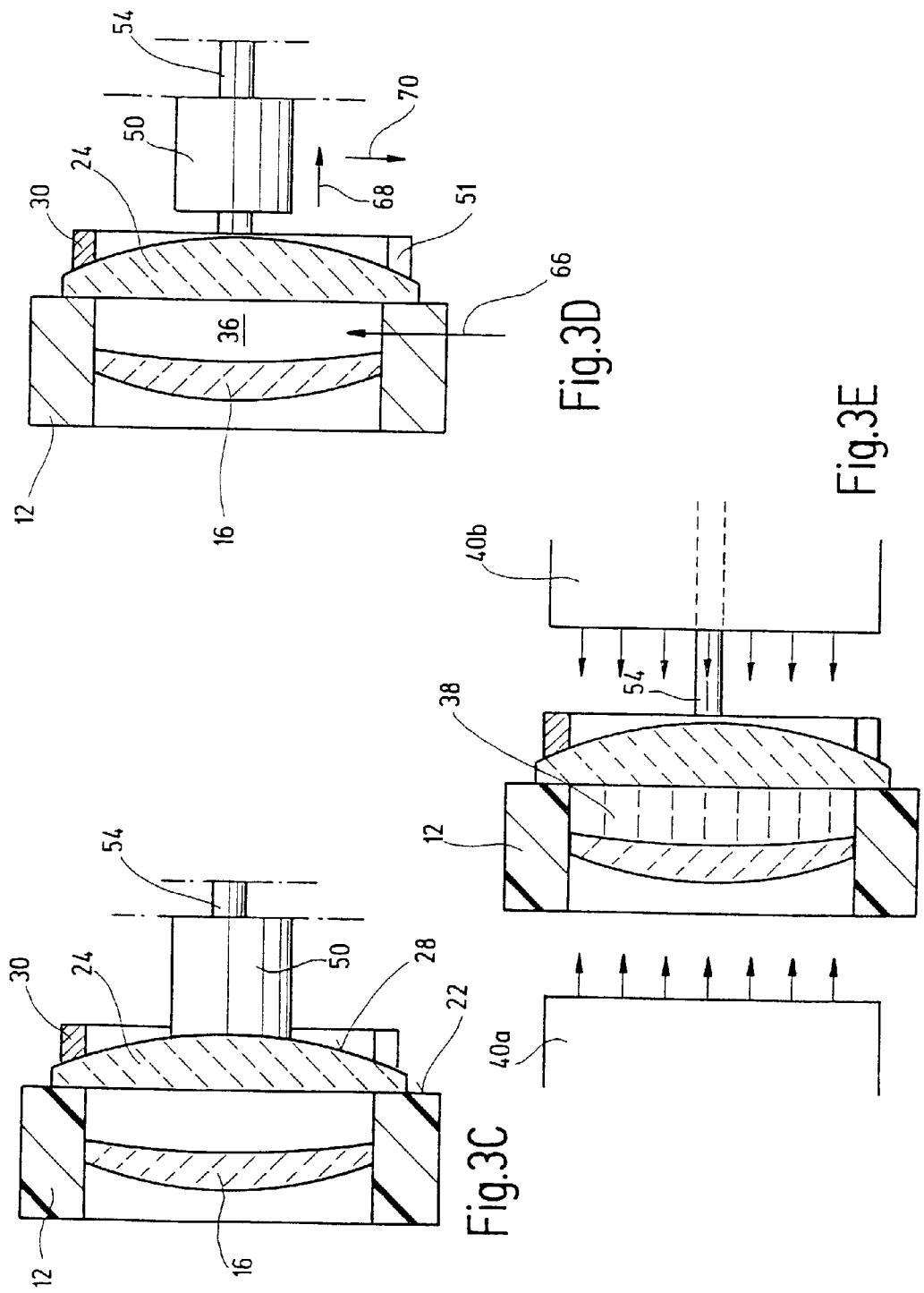

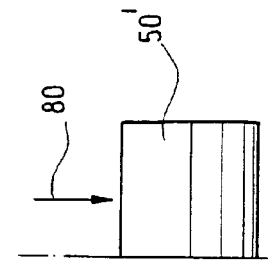
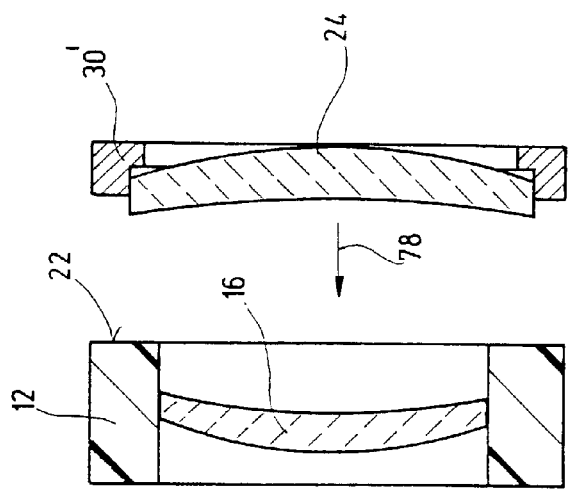
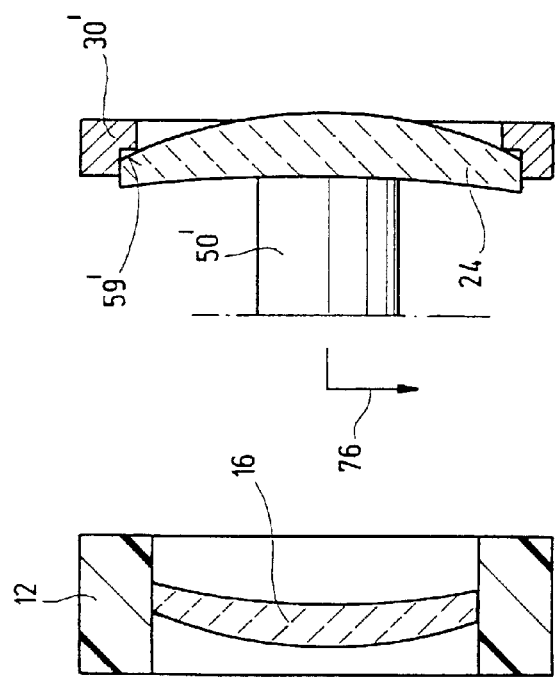
Fig.4C
Fig.4D

APPARATUS AND METHOD FOR MOLDING OPTICAL LENSES

FIELD OF THE INVENTION

The present invention is related to the field of molding optical lenses, in particular for spectacles.

More specifically, the invention is related to an apparatus for molding optical lenses comprising:
a) a first molding shell having a rounded peripheral surface with a first diameter, relative to a central axis;
b) a sealing element surrounding the first molding shell;
c) means for radially clamping the sealing element against the peripheral surface;
d) a second molding shell having an essentially rounded peripheral surface with a second diameter, relative to a central axis, the second diameter being greater than the first diameter;
e) means for axially clamping the second molding shell with its inner shell surface against a radial front surface of the sealing element, such that the molding shells are arranged essentially parallel to each other, a hollow cavity being enclosed between the molding shells and the sealing element and having a shape corresponding to the shape of the lens to be molded, the axially clamping means engaging the second molding shell with a clamping element at the second molding shell peripheral rim.

The invention is, further, related to a method for molding optical lenses in an apparatus of the type specified before.

An apparatus and a method of the afore-mentioned kind are disclosed in WO 01/32407 A1.

BACKGROUND OF THE INVENTION

For the manufacture of optical lenses, in particular optical lenses for spectacles, it is well-known in the art to manufacture such lenses from plastic material in order to achieve a low weight of the lenses, as compared with glass. Insofar, it is also known to either manufacture such plastic material lenses by mechanically working a lens blank or by molding or casting the lens from a polymerizable plastic material in its final shape.

U.S. Pat. No. 5,547,681 discloses a method and an apparatus for casting optical lenses. The apparatus comprises two molding shells of equal diameter being clamped in parallel orientation with respect to each other, wherein the clamping is effected by means of two jaws engaging the peripheral surfaces of the shells. At their inner surface the jaws are provided with sealings such that a hollow cavity is created being delimited on two parallel sides by the molding shells and at its periphery by the jaws. The molding shells on their interior surfaces are configured with the profile of the lens to be manufactured such that when the axial distance between the two molding shells is appropriately set, the hollow cavity has exactly the shape of the lens to be manufactured.

In another apparatus and a corresponding method, as disclosed in WO 01/32407 A1, mentioned at the outset, two molding shells are likewise utilized. The molding shells are arranged with a certain distance with respect to each other and are sealed at their periphery by means of a sealing element. In this prior art apparatus, however, the molding shells have a different diameter. The molding shell with the smaller diameter is tightly received in a tube-shaped sealing element. At its terminal end facing the larger molding shell, the sealing element terminates in a radially expanded flange. The larger molding shell is axially clamped or pressed against the radial surface configured by that flange under pressure. In this case, too, the hollow cavity is filled with a polymerizable plastic material.

In this case as well as in the case mentioned before, the plastic material is preferably polymerized by irradiating light thereon. For that purpose the molding shells are optically transparent for the corresponding wavelength (preferably ultraviolet light). Two sources of ultraviolet light are disposed on opposite sides of the molding shells, the light of which being irradiated into the hollow cavity for polymerizing the plastic material contained therein.

WO 01/32407 A1, further, discloses to utilize a circular shaped means for axially pressing or clamping the larger molding shell against the radial front surface of the sealing element. The circular shaped means is applied to the molding shell at its peripheral edge area with which the molding shell adjoins the radial front surface of the sealing element. Preferably, the clamping means shall be configured as a hood or as a multi-arm assembly. The clamping or pressing force for the clamping means shall preferably be generated by vacuum.

It is, therefore, an object underlying the present invention to improve an apparatus and a method of the type specified at the outset, such that an apparatus is achieved that may be operated reliably under practical conditions, and allowing on the one hand side to press or clamp the larger molding shell with the required high clamping pressure against the sealing element, and, on the other hand side, does not disturb the feeding of different molding shells for different lenses nor disturbs the approaching of lamps for polymerizing the plastic material mass.

SUMMARY OF THE INVENTION

With the apparatus specified at the outset, this object is achieved in that the radially clamping means and the axially clamping means are structurally distinct and independent one from the other, and that the axially clamping means are arranged on an outer shell surface of the second molding shell, opposite to the inner shell surface.

In a method of the type specified at the outset, the object underlying the invention is achieved in that the radial clamping of the sealing element and the axial clamping of the second molding shell are effected independently from one another, and by means of structurally distinct elements, and that the axially clamping means are arranged on an outer shell surface of the second molding shell, opposite the inner shell surface.

The object underlying the invention is thus entirely solved.

According to the invention, the object to axially press or clamp the second, larger molding shell against the radial front surface of the sealing element is effected by separate means operating strictly independently from any other assemblies of the entire apparatus. By doing so, it is possible to utilize mechanical displacement and clamping means allowing to approach the second molding shell in a predetermined manner, i.e. with a correspondingly high precision of its position, against the radial front surface and to press same against the front surface with a likewise predetermined clamping pressure, according to the specific application. All this may happen without any interaction, for example with the means for clamping and sealing the first, smaller molding shell within the sealing arrangement. Further, by positioning the means for axially clamping, care has been taken that these means do not disturb the trajectory of other displacement units, in particular the displacement units for approaching the second molding shell from a corresponding magazine and the means for displacing the lamps used for polymerizing the plastic material mass.

Seen as a whole, a reliable apparatus and a corresponding production process are created guaranteeing a safe operation under practical conditions.

In a preferred embodiment of the inventive apparatus the clamping element is configured as a clamping ring.

This measure has the advantage that almost the entire cross-section of the second molding shell, in any event the cross-section corresponding to the smaller diameter of the first molding shell, may be utilized for an undisturbed optical irradiation therethrough. In such a way the polymerizing times for the lens to be manufactured may be substantially reduced and, therefore, the productivity of the apparatus may be increased.

In a preferred improvement of the afore-specified embodiment, the clamping ring is provided with at least one gap extending axially through the clamping ring.

This measure has the advantage that very compact apparatuses may be designed in which the trajectories of the various displacement units may even overlap. Considering that a clamping ring is a structurally stable element even if it is provided with a gap at its periphery, the above-mentioned advantages of uniformly clamping or pressing at the outer periphery of the second molding shell may be maintained, irrespective of the fact that a holding arm, for example, for another displacement unit may be guided through the gap when the inventive apparatus is in operation, without creating a collision with the clamping ring.

In still another preferred embodiment of the inventive apparatus the clamping element is provided with means for holding the second molding shell which, as the case may be, could be positively engaging or frictionally engaging. In that context one could provide the holding means with a frictional coating, one could provide suction means, as known per se, or use any other similar components.

In still another preferred embodiment of the inventive apparatus the clamping element is adapted to be actuated on at least two points on the peripheral rim of the second molding shell, or, according to an improvement of the inventive method, is actuated on at least two points at the peripheral rim of the second molding shell.

This measure has the advantage that a torsionally stiff assembly is created in which no inadmissibly high bending moments are generated during the clamping operation which would not allow to uniformly press the second molding shell over its entire periphery. This may be particularly achieved when the two points are located diametrically opposite on the periphery of the clamping element.

According to an improvement of the last-mentioned embodiment of an inventive apparatus the clamping element is adapted to be actuated by means of rods.

This measure has the advantage that through the use of such very thin and elongate elements a relatively large free space is created directly behind the clamping element, allowing to position and/or displace further assemblies therein.

This holds true in particular when according to still another improvement of the apparatus the rods have a distance between them being such that a source of light may be approached towards the outer shell surface of the second molding shell when the second molding shell is held by the clamping element, or, if according to the inventive method the points have a distance one from the other, and after filling the hollow cavity with a plastic material adapted to be polymerized by means of light, a source of light is approached between the points towards the outer shell surface of the second molding shell when it is held by the clamping element.

As the case may be, one might utilize relatively thin rods, flat arms or the like and put same at a distance relative to one another so that a sufficiently large free space is created, as already mentioned. Insofar, it makes principally no difference whether the two rods or the like are arranged in a horizontal plane, or in a vertical plane, or in an inclined plane, as long as the trajectory of the assembly to be displaced, for example the sources of light, preferably extend under right angles relative to the plane defined by the rods.

In particularly preferred variations of the invention means are provided for feeding the second molding shell from a magazine, as already mentioned, the means comprising a displacement unit. This measure bears in mind that in an apparatus of the inventive type or according to a corresponding method small series at most of lenses with alike parameters are manufactured. In most cases, however, individual lenses will be manufactured as have been individually prescribed by an ophthalmologist for a particular patient. The afore-mentioned magazine now contains those molding shells as are required for the manufacture of such lenses (spectacle lenses) having specifications as occur mostly in practice, so that for an individual production of a lens the two corresponding molding shells for the front side and the back side of the lens to be manufactured have to be taken from a magazine and have then to be arranged at a predetermined distance with respect to each other in the area of the sealing assembly.

Within the scope of the present invention, two alternate methods may be used:

According to a first method, the apparatus is configured such that the second molding shell may be fed to the radial front surface by means of the displacement unit. Speaking in method terms, the second molding shell is fed from the magazine by means of the displacement unit and is applied to the radial front surface, wherein the clamping element is approached against the second molding shell under axial pressure and, subsequently, the displacement unit is driven away from the second molding shell.

This means that according to this alternative the second molding shell is approached to the radial front surface where the clamping element "takes over" in order to then effect the pressing or clamping process as such, while the displacement unit is simultaneously driven away.

According to the second alternative, however, the second molding shell is fed to the clamping element by means of the displacement unit. Speaking in method terms, the second molding shell is fed from the magazine by means of the displacement unit and is then transferred to the clamping element, whereby the clamping element together with the second molding shell is then approached to the radial front surface under axial pressure, while the displacement unit is driven away from the clamping element.

According to this second alternative, a transfer is, therefore, first effected between the displacement unit and the clamping element, before the second molding shell held by it is approached to the front surface of the sealing assembly.

The first-mentioned alternative has the advantage that the displacement unit engages the second molding shell at its outer surface being less sensitive, while the second alternative has the advantage that the sequence of movements is simpler.

Further advantages become apparent from the description and the enclosed drawing.

It goes without saying that the features mentioned before and those that will be explained hereinafter, may not only be used in the particularly given combination, but also in other combinations, or alone, without leaving the scope of the present invention.

BRIEF DESCRIPTION OF THE DRAWING

Embodiments of the invention are shown in the drawing and will be further described in the subsequent description.

FIGS. 3A through 3E show an illustration, similar to that of FIG. 1, for five operational positions of a first embodiment of an inventive apparatus;

FIGS. 4A through 4D show an illustration, similar to that of FIGS. 3A through 3E, however, for an alternate embodiment of the invention.

DETAILED DESCRIPTION OF PREFERRED EMBODIMENTS

Figure 1:
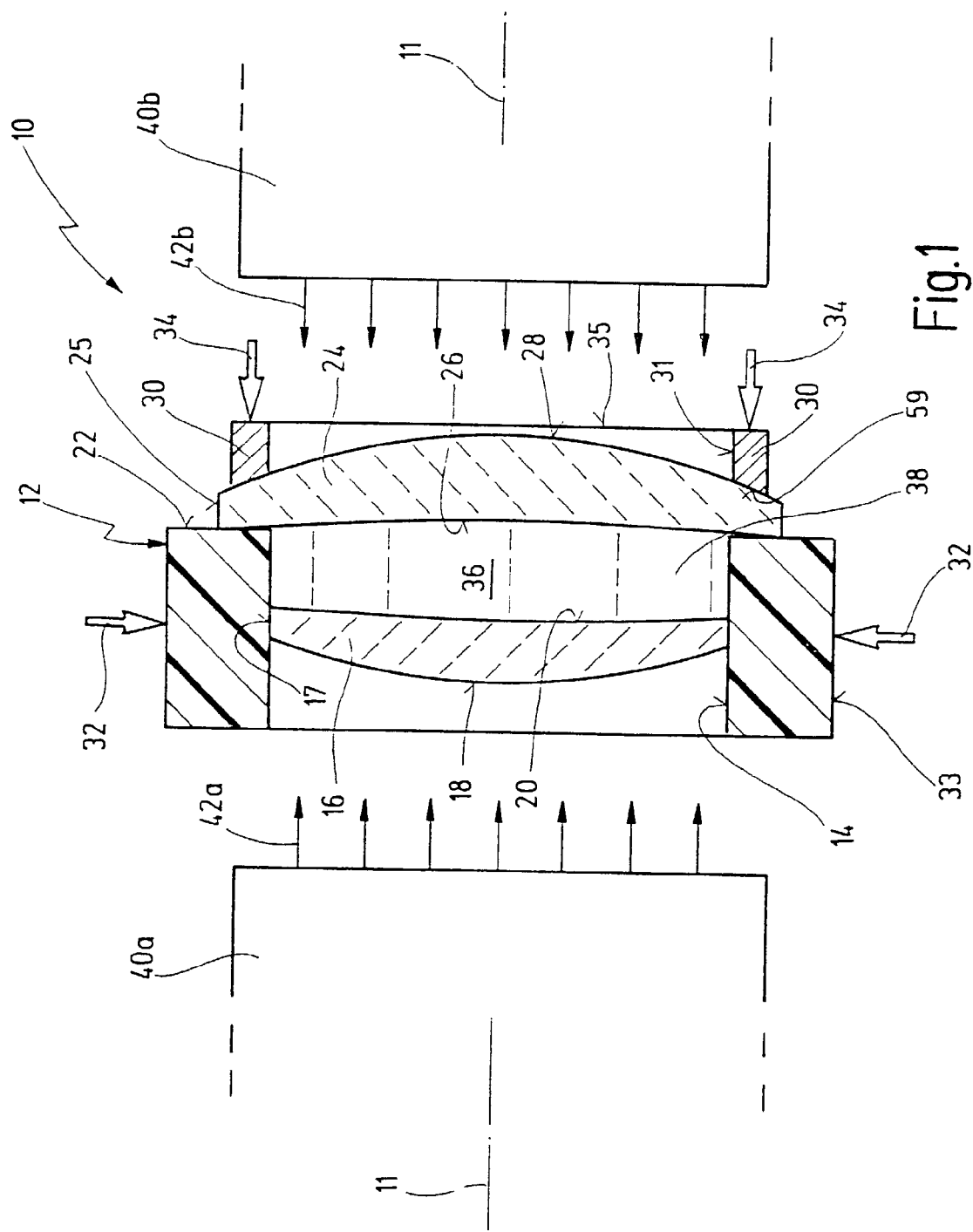
FIG. 1 shows a side elevational view, partially in cross-section, of an embodiment of an inventive apparatus.
Figure 2:
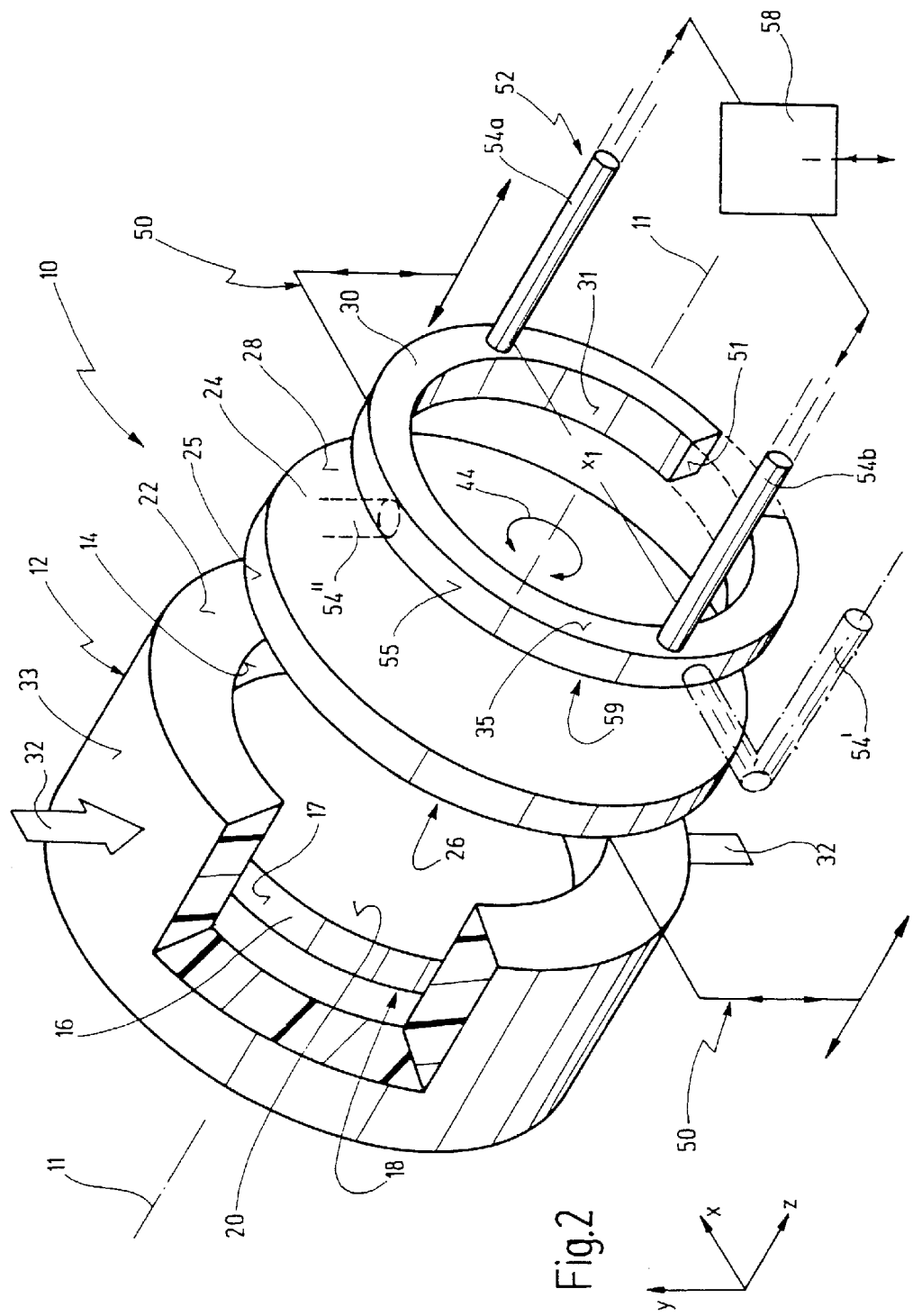
FIG. 2 shows the apparatus of FIG. 1, in a perspective view, partially broken away, for explaining further details and modifications of the invention.

In FIGS. 1 and 2 reference numeral 10 as a whole indicates an apparatus for molding optical lenses from a plastic material. Apparatus 10 is designed along a common axis 11.

A sealing element 12 is made from an elastic plastic material and has the shape of a short tube with a cylindrical inner surface 14. A first molding shell 16 is seated within sealing element 12 and has a peripheral surface 17 tightly adjoining cylindrical inner surface 14 of sealing element 12. First molding shell 16 has an outer surface 18 of preferably convex shape, while an inner surface 20 may have a different curvature, depending on the particular lens to be manufactured.

On its right-hand side in FIG. 1 sealing element 12 is provided with a radial, annular front surface 22. A second molding shell 25 tightly adjoins radial front surface 22. Reference numeral 25 designates a peripheral surface of second molding shell 24. Second molding shell 24 likewise has an inner surface 26 and an outer surface 28 for which the same holds true as already explained for the inner and the outer surfaces 18, 20 of first molding shell 16.

A clamping ring 30 is provided for axially pressing or clamping second molding shell 24 against radial front surface 22. Clamping ring 30 has a cylindrical inner surface 31.

As may be taken from FIG. 3A, sealing element 12 has an inner diameter $d_1$ being equal to the outer diameter of first molding shell 16. Second molding shell 24 has an outer diameter $d_2$ greater than $d_1$ but smaller than the outer diameter of sealing element 12 being designated with $d_3$. Clamping ring 30 in the embodiment of FIG. 3A has an outer diameter $d_4$ smaller than diameter $d_2$. The inner diameter of clamping ring 30 preferably has the same size as the inner diameter $d_1$ of sealing element 12.

If in the present context the term "diameter" is used, it goes without saying that within the scope of the present invention also not exactly circular elements may be used. Instead, one could also use elements having an elliptical or a barrel-shaped cross-section, or similar elements, without leaving the scope of the present invention.

First arrows 32 in FIGS. 1 and 2 indicate that a radial pressing or clamping force is exerted on sealing element 12 within the area of first molding shell 16, in order to hold same safely and tightly within sealing element 12. The means required therefore are disclosed in the documents discussed at the outset and, hence, need not be discussed again in detail within the present context. Insofar, it is important that a radial force be exerted on a peripheral surface 33 of sealing element 12.

Second arrows 34 likewise indicate that clamping ring 30 exerts an axial pressure (relative to the common longitudinal axis 11) on the second molding shell 24 from the right-hand side, as viewed in FIG. 1 for pressing same against radial front surface 22. The axial clamping force may engage clamping ring 30 in the area of an outer radial front surface 35.

When the two clamping forces (arrows 32 and 34) are effective, a hollow cavity 36 is defined between molding shells 16 and 24 as well as sealing element 12, the hollow cavity 36 having a shape corresponding exactly to the shape of the lens to be manufactured. For that purpose first molding shell 16 may be displaced along axis 11 through means (not shown) for setting the lens thickness. For manufacturing a predetermined cylinder shape first molding shell 16 may, further, be rotated about axis 11. In FIG. 2 this is indicated by a third arrow 44.

In any event hollow cavity 36 is finally filled with a polymerizable plastic material mass 38. Subsequently sources of light 40a and 40b are approached from opposite sides. Sources of light 40a, 40b generate a light 42a, 42b having a wavelength at which plastic material mass 38 is polymerized. Conventionally, ultraviolet light is utilized for conventional monomers, as are normally used for the manufacture of lenses. It goes without saying that molding shells 16 and 24 are optically transparent at the corresponding light wavelength, for that purpose.

In FIG. 2 reference numeral 50 indicates a first displacement unit allowing to displace second molding shell 24 into the position shown. For that purpose first displacement unit 50 may be arbitrarily displaced in space, for example along the three axes of the Cartesian coordinate system x, y, z depicted in FIG. 2. Further details will be described below together with FIGS. 3 and 4.

In order to avoid a collision between holding and guiding elements of first displacement unit 50 and/or of displacement units for source of light 40b with clamping ring 30, in particular in case the latter is also displaced in space, clamping ring 30 is provided with a recess or gap 51 extending therethrough. Gap 51 serves as a transit for the afore-mentioned holding and guiding elements of other displacement units.

In FIG. 2 reference numeral 52 designates a second displacement unit used for displacing clamping ring 30. Also in this context it holds true that any conceivable movements within space may be exerted, for example along the three axes of the already mentioned Cartesian coordinate system.

In the embodiment shown, two rods 54a, 54b are provided engaging outer radial front surface 35 of clamping ring 30. Rods 54a, 54b are connected to outer radial front surface 35 at diametrically opposite points. Rods 54a, 54b preferably extend parallel to each other and have a distance $x_1$ from each other determining the clearance, i.e. the free space between rods 54a, 54b.

In the event that the clearance defined by distance $x_1$ should not be sufficient for a particular application, the rods could also engage clamping ring 30 at an outer peripheral surface 55 and could then preferably be bent, as indicated in FIG. 2 by 54'. Further, it goes without saying that rods 54 must not at all be arranged within a horizontal plane, but could also be arranged in a vertical plane, as indicated in FIG. 2 by 54". Inclined arrangements could of course also be used. In any event, it is preferred when the trajectory of an assembly being displaced through the clearance between rods 54 extends under right angles relative to the plane defined by the rods in order to guarantee that collisions are avoided as much as possible.

In FIG. 2 reference numeral 58 indicates an actuator used for displacing clamping ring 30 in a predetermined manner. Actuator 58 also generates the clamping pressure in the z-direction, i.e. along axis 11. Actuator 58 may be of any conventional design, i.e. may operate with an electric motor, or hydraulically, or pneumatically.

The operation of apparatus 10 shown in FIGS. 1 and 2 shall now be explained along with five depictions of operational positions in FIGS. 3A through 3E.

FIG. 3A shows the initial position, wherein the respective diameters have been marked at their corresponding elements, as explained above. It goes without saying that in particular the illustration of FIG. 3 is extremely schematic and, therefore, should in no way be interpreted in a limiting sense with respect to the dimensions shown nor with respect to any shown element.

In the initial position of FIG. 3A first displacement unit 50 is located still way outside, preferably below the clearance created through axial displacement of clamping ring 30 by a distance $z_1$ between sealing element 12 and clamping ring 30. First displacement unit 50 preferably comprises a tube approaching outer surface 28 of second molding shell 24, when the latter is at a predetermined position in a magazine. The tube approaching second molding shell 24 has an opening with a sealing provided therein. If a vacuum is generated within the tube, second molding shell 24 may be picked up and taken away by first displacement unit 50.

In FIG. 3A a fourth arrow 60 indicates that first displacement unit 50 is now put into action in order to be displaced into the clearance ($z_1$) between sealing element 12 and clamping ring 30, such that all afore-mentioned elements are now arranged coaxially along common central axis 11.

This condition is attained in FIG. 3B. From the operational position of FIG. 3B first displacement unit 50 is now displaced towards the left-hand side in z-direction (fifth arrow 62), wherein it would make sense if clamping ring 30 follows immediately (sixth arrow 64) in order to approach second molding shell 24 from behind. In order to avoid collisions between holding and guiding elements of first displacement unit 50 and clamping ring 30 during that phase of movements, gap 51 is provided within clamping ring 30, as already mentioned.

The result of these movements is shown in FIG. 3C. In this operational position clamping ring 30 "takes over" second molding shell 24 from first displacement unit 50. This is effected in that first displacement unit initially applies second molding shell 24 loosely or under slight pressure against radial front surface 22 of sealing element 12. Clamping ring 30 is now further approached towards outer surface 28 of second molding shell 24 and bridges the clamping force of first displacement unit 50.

FIG. 3D shows that hollow cavity 36 has now been configured. A seventh arrow 66 indicates that plastic material mass 38 may now be brought into hollow cavity 36.

Simultaneously first displacement unit 50 may let second molding shell 24 loose by being displaced along the z-direction towards the right-hand side as shown with an eighth arrow 68. Simultaneously or shortly thereafter first displacement unit 50 may now be driven away laterally or downwardly, as shown with a ninth arrow 70.

FIG. 3D now shows a situation similar to that of FIG. 1, in which sources of light 40$a$, 40$b$ have been approached in order to polymerize plastic material mass 38.

FIG. 3E clearly shows that rods 54 do not disturb the displacement of sources of light 40$a$, 40$b$ because they extend under lateral distance thereto.

In a variation shown in FIGS. 4A through 4D the structural design is different insofar as a clamping ring 30' with a diameter $d_5$ is utilized being greater than diameter $d_2$ of second molding shell 24. Clamping ring 30' on the left-hand side in FIG. 4A has a contact surface 59' serving to receive peripheral surface 25 of second molding shell 24. This may be made through positive engagement, frictional engagement, by sucking or the like.

Figures 4A, 4B:
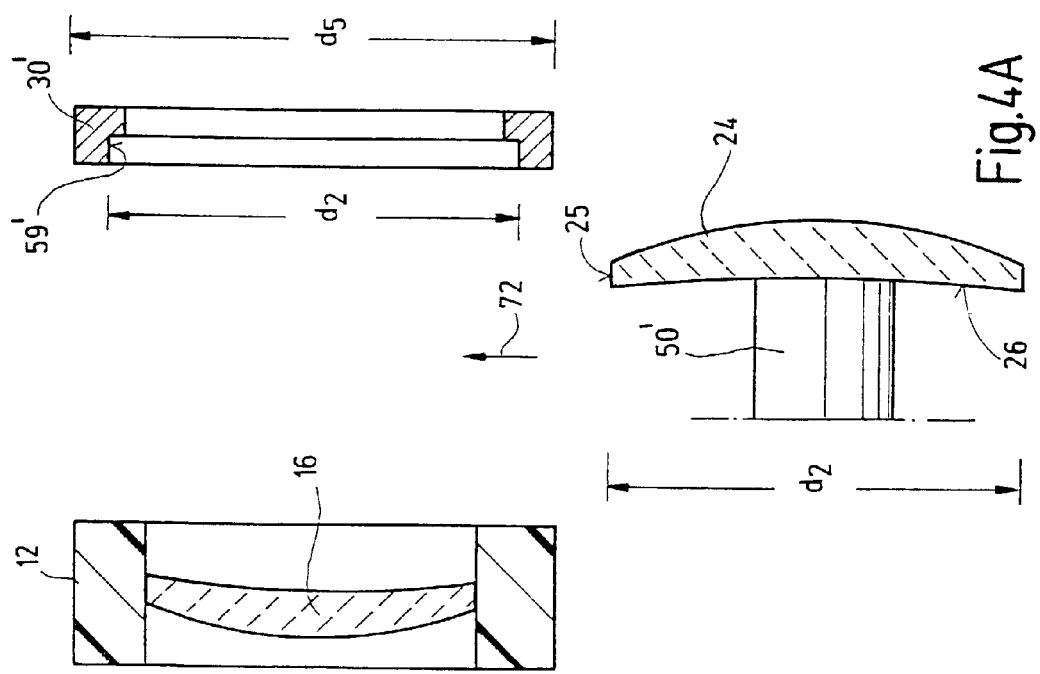

The initial situation, further, is distinct because first displacement unit 50' in the embodiment of FIG. 4A engages inner surface 26 of second molding shell 24.

From the initial position of FIG. 4A corresponding mutatis mutandis to the situation of FIG. 3A, first displacement unit 50' is now displaced upwardly (tenth arrow 72). As soon as it has reached the clearance between sealing element 12 and clamping ring 30' (FIG. 4B) first displacement unit 50' is now displaced towards the right-hand side in the z-direction (eleventh arrow 74) and inserts second molding shell 24 with its outer peripheral surface 25 into contact surface 59' of clamping ring 30'.

After second molding shell 42 has been handed over to clamping ring 30' (FIG. 4C), first displacement unit 50 may now again be displaced along the z-direction towards the left-hand side and then downwardly (twelfth arrow 76).

Clamping ring 30' now takes second molding shell 24 along and displaces same along the z-direction towards the left-hand side (thirteenth arrow 78), until it comes to rest on radial front surface 22 of sealing element 12 and is there fixated by axial force. In the meantime first displacement unit 50' has been laterally driven away (fourteenth arrow 80).

The apparatus is now in a position corresponding to that of FIG. 3D so that in the same manner as discussed with FIG. 3E the casting may be effected.

What is claimed is:

1. An apparatus for molding optical lenses comprising:
   a) a first molding shell having a first rounded peripheral surface with a first diameter and defining a longitudinal axis;
   b) a second molding shell having a second essentially rounded peripheral surface with a second diameter greater than said first diameter, said second molding shell having, further, an inner shell surface, and an outer shell surface opposite to said inner shell surface;
   c) a sealing element surrounding said first molding shell;
   d) means for radially clamping said sealing element against said first peripheral surface;
   e) a clamping ring for axially clamping said second molding shell with said inner shell surface against a radial front surface of said sealing element, such that said molding shells are arranged essentially parallel to each other along said axis, a hollow cavity being enclosed between said molding shells and said sealing element, said hollow cavity having a shape corresponding to a shape of a lens to be molded, said clamping ring being arranged on said outer shell surface and engaging said second molding shell with a clamping element at a peripheral rim of said second molding shell, said radially clamping means and said moans clamping ring being structurally distinct and independent one from the other, said clamping ring being provided with at least one gap extending axially therethrough along a portion of the periphery of the clamping ring, f) means for feeding said second molding shell from a magazine, said feeding means comprising a displacement unit, said displacement unit having a holding element engaging said second molding shell on said outer shell surface, said displacement unit being adapted to feed said second molding shell to said radial front surface along a radial direction from a position offset from said axis with said holding element extending parallel to said axis, said holding element being adapted to pass through said gap when said clamping ring is held at an axial distance from said radial front surface when said displacement uinit is moved along said radial direction.

2. The apparatus of claim 1, wherein said clamping ring is provided with means for positively engaging said second molding shell.

3. The apparatus of claim 1, wherein said clamping ring is provided with means for frictionally engaging said second molding shell.

4. The apparatus of claim 1, wherein said clamping ring is adapted to be actuated on at least two points on said peripheral rim of said second molding shell.

5. The apparatus of claim 4, wherein said points lie on a radial front surface of said clamping ring.

6. The apparatus of claim 4, wherein said points lie on a peripheral surface of said clamping ring.

7. The apparatus at claim 4, wherein said clamping element is adapted to be actuated by means of rods.

8. The apparatus of claim 7, wherein said rods have a distance between them being such that a source of light may be approached towards said outer shell surface, when said second molding shell is held by said clamping ring.

9. The apparatus of claim 1, wherein said clamping ring is adapted to be approached towards said second molding shell under axial pressure after said displacement unit has fed said second molding shell to said radial front surface, said displacement unit being adapted to be driven away from said second molding shell thereafter.

* * * * *

UNITED STATES PATENT AND TRADEMARK OFFICE
CERTIFICATE OF CORRECTION

PATENT NO. : 6,994,538 B2  
APPLICATION NO. : 10/222587  
DATED : February 7, 2006  
INVENTOR(S) : Markus Haidl et al.

Page 1 of 1

It is certified that error appears in the above-identified patent and that said Letters Patent is hereby corrected as shown below:

<u>Column 8,</u>  
Line 67, delete "moans".

<u>Column 9,</u>  
Line 16, "uinit" should be -- unit --.

<u>Column 10,</u>  
Line 10, "element" should be -- ring --.

Signed and Sealed this

Twenty-second Day of August, 2006

JON W. DUDAS  
*Director of the United States Patent and Trademark Office*